United States Patent [19]
Plata et al.

[11] Patent Number: 5,382,306
[45] Date of Patent: Jan. 17, 1995

[54] SPRAY UNIT FOR COOLING EXTRUDED SECTIONS

[75] Inventors: Miroslaw Plata, Vetroz; Bernard Bourqui, Noes; Werner Strehmel, Sierre, all of Switzerland

[73] Assignee: Alusuisse-Lonza Services Ltd., Zurich, Switzerland

[21] Appl. No.: 72,117

[22] Filed: Jun. 7, 1993

[30] Foreign Application Priority Data

Jun. 19, 1992 [CH] Switzerland ............ 01947/92-0

[51] Int. Cl.6 ............................................. C21D 1/62
[52] U.S. Cl. ........................ 148/511; 148/637; 148/688; 266/87; 266/114
[58] Field of Search .......... 266/114, 113, 103, 102, 266/78, 96, 127, 87; 148/511, 637, 688

[56] References Cited

U.S. PATENT DOCUMENTS

| | | | |
|---|---|---|---|
| 3,303,062 | 2/1967 | Clumpner et al. | 266/113 |
| 3,507,712 | 4/1970 | Scott | 266/113 |
| 4,065,252 | 12/1977 | Hemsath et al. | 266/113 |
| 5,284,327 | 2/1994 | Arthur et al. | 266/114 |

FOREIGN PATENT DOCUMENTS

| | | |
|---|---|---|
| 0343103 | 11/1989 | European Pat. Off. |
| 2241360 | 3/1975 | France . |
| 2256790 | 8/1975 | France . |
| 8810085 | 10/1988 | Germany . |
| 1148579 | 4/1969 | United Kingdom . |
| 9202316 | 2/1992 | WIPO . |

*Primary Examiner*—Scott Kastler
*Attorney, Agent, or Firm*—Bachman & La Pointe

[57] ABSTRACT

The spray unit lies downstream, in-line with an extrusion press and serves to cool metallic sections in particular sections of aluminum or an aluminum alloy from all sides. The cooling medium emerges from spray nozzles program-controlled in the direction of the section. The distance, the cross-section distribution and the direction of the spray nozzles are adapted specific to the geometrical shape and distribution of mass in the section. The optimum parameters are determined and stored in the unit processor. The spray nozzles are arranged in nozzle beams running in the direction of the extruded section. The nozzle beams comprise at least one longitudinal water channel and two longitudinal air channels, whereby cross-intersecting channels branch off from the water channels to the spray nozzles and the air channels terminate in air gaps which are directed towards the nozzle outlets.

The extruded sections are passed through the spray unit and cooled, at a rate that exceeds the critical cooling rate specific to the material, by a program-controlled, sprayed cooling medium in a manner that takes into account the shape of the section and the distribution of mass in the section. Using uniform cooling on all sides, sections that are extruded straight can be kept straight, while sections that are distorted on extrusion can be corrected with respect to bending and/or twisting by non-uniform cooling.

13 Claims, 7 Drawing Sheets

FIG. I

SPRAY UNIT FOR COOLING EXTRUDED SECTIONS

BACKGROUND OF THE INVENTION

The invention relates to a spray unit, downstream of and in-line with an extrusion press, for cooling metallic extruded sections from all sides, in particular sections of aluminum or an aluminum alloy, and featuring a cooling medium that is program-controlled, directed at the extrusion from spray nozzles and such that the distance, the cross-sectional distribution and the direction of the spray nozzles are adaptable specific to the geometrical shape of the section and the distribution of mass in the section, and the spray nozzles are arranged in nozzle beams running in the direction of the extruded section. The invention relates further to a process for optimal setting of the spray nozzles and to a process for operating a spray unit.

When cooling extruded sections, wherein rapid cooling is also referred to as quenching, large sections of irregular shape and mass distribution present problems in that the individual cross-sectional regions have different thermal capacities. Rapid cooling of thin cross-sections and slow cooling of thick cross-sections produce stresses that can lead to considerable deformation and consequently to repair work or even scrap.

Viewed from that standpoint, it would appear that slow cooling is desireable. At the same time, however, slow cooling leads to coarse grains. The section becomes too weak and has poor mechanical properties. If, on the other hand, the section is quenched, then the existing structure is frozen in, and the small grains obtained offer advantages with respect to mechanical properties. The cooling rate is therefore an important parameter in extrusion technology and must be optimized in such a way that on the one hand no permanent deformation occurs, or if so then only to a degree permitted by the given tolerance limits, and on the other hand such that grain growth is limited to such an extent that adequate mechanical properties are retained.

Cooling a section as it emerges from the extrusion press depends not only on the amount, thermal capacity and delivery of the cooling medium, but also on the rate at which the extrusion emerges from the press. If this extrusion speed is very low, then a cooling medium of low thermal capacity such as air can be employed. In general somewhat too slow cooling is less of a disadvantage than too fast cooling as slightly reduced mechanical strength is more tolerable than a distorted section. The use of air as a cooling medium however has its limits, as the productivity of the extrusion process is reduced correspondingly with the extrusion speed and air cooling can not be employed for all alloy compositions. Air is therefore not an optimal cooling medium.

Quenching in a water bath or by spraying water onto the extrusion on the other hand often results in too strong cooling. An irregular section distorted by non-uniform cooling over its cross-section has to be straightened again by use of very large forces, which is complicated and expensive. The process often has to be repeated several times over.

Compared to an air stream with a cooling capacity of about 100 to 150 $W/m^2 \cdot °C$, a water bath with forced circulation offers a cooling capacity of 20 to 50 $kW/m^2 \cdot °C$, and a water jet as much as 20–100 082 $kW/m^2 \cdot °C$. In a water bath, however, in spite of strong stirring, local bubbles of steam form; this strongly reduces the cooling action locally and plastic deformation can occur. Using a water jet this problem can be diminished but not completely prevented.

By spraying an air-water mixture it is possible to practically eliminate the above mentioned problem completely. Using an optimum amount of water makes it possible for the fine droplets to vaporize completely. That way a heat transfer or cooling action of 0.5 to 30 $kW/m^2 \cdot °C$ is achieved. The sprayed air-water mixture can easily penetrate the remotest corner or smallest undercut on the surface of the section without the risk of steam bubbles forming. A spray of air-water mixture can be used satisfactorily for cooling practically all alloys at moderate to slow cooling rates.

Described in EP-A-0 429 394 is a process and a device for cooling cast ingots of aluminum after homogenization. The slabs emerging at a first temperature are led from a soaking furnace, continuously in the longitudinal direction one after another "in-line", at a program-controlled rate of advance through a spray unit where they undergo program controlled spray cooling by a cooling medium from all sides to reach a preselected surface temperature. The surface and the interior of the slabs reach the same temperature shortly after leaving the Spray unit. The spray unit is conceived such that it is fitted with groups or individual adjustable nozzles for the cooling medium over its whole length and over the whole periphery of its interior. These nozzles are preferably designed according to EP-A-0 343 103 and permit a pendular movement of the spray cone, which effects more uniform cooling over the total surface area.

The slabs cooled in accordance with EP-A-0 429 394 are always regular in cross-section, for example, rectangular, square or round. The arrangement of the nozzles in the spray unit is conceived accordingly. The knowledge and experience from EP-A-0 429 394 relate to regularly shaped slabs, e.g. in the shape of rectangular, square or round slabs. In the case of sections that are irregular in cross-section and mass distribution there arise the above mentioned problems that cause the sections to emerge distorted from the spray unit.

A spray unit with tiltable spray nozzles arranged on nozzle beams is in principle known from DE-U-88 10 085.

SUMMARY OF THE INVENTION

In view of these facts it is the object of the present invention to provide a spray unit of the kind discussed above, a process for determining the optimum setting for the spray nozzles and a process for operating the spray unit, which permits rapid and trouble-free cooling of all types of sections, also irregular and/or large sections without bending or twisting them outside the tolerance limits. The pronounced degree of distortion that normally occurs at the start of extrusion and on billet changes or unexpected interruptions should also be mastered.

With respect to the unit, the object is achieved by way of the invention in that the nozzle beams comprise at least one longitudinal water channel and two longitudinal air channels, whereby cross-intersecting channels branch off from the water channels to the spray nozzles and the air channels terminate in air gaps that are directed towards the nozzle outlets. The nozzle beams are preferably made up of modules that are arranged end to end in rows or divided by transverse walls in such a way that modules are created. The modules can be supplied separately with coolant media, in particular water and air.

A preferred version of the nozzle beams or modules is such that these feature a preferably extruded main body in which the spray nozzles are releasably mounted and are held in place by an approximately U-shaped cover sheet. Set onto the main body are covering parts that form air channels and feature an air gap that is directed towards the nozzle outlets; the air chambers join up with the air channels via connecting channels. The cover sheet is provided with bulges between the air gaps and the nozzle outlets in order to effect sideways deflection of the air stream emerging from the air gap.

The adjustment of distance, cross-section distribution and direction of the spray nozzles is achieved in a manner that is familiar to machine designers. The adjustment by mechanical means, in order to effect parallel displacement or swivelling, takes place quickly and easily, is adaptable to suit a large number of different types of section, and includes also the systems for leading and suspension of the sections.

The spray unit preferably includes a likewise generally known vapor suction unit, a means of preventing water escaping in the direction of the extrusion press outlet, and requires only a minimum of maintainance.

By setting the parameters: distance of the spray nozzles from the extruded section surface, and the distribution and direction of the spray nozzles it is possible to ensure that all surfaces of the extruded section passing through the unit are cooled equally quickly. Surface areas over larger masses can be sprayed more intensively, for example by means of nozzles arranged closer to the section surface, or by intersecting spray cones.

Using the above mentioned generally known means, the spray nozzles which are arranged on nozzle beams running longitudinally in the same direction as the section can be displaced in a parallel manner and/or swivelled into another geometrical position either individually or in groups. Finally, the nozzle beams can be rotated around their axes in order to alter the direction in which the nozzles spray. Of course versions are also conceivable in which the nozzles can be adjusted individually. This, however, gives rise to a large outlay that would possibly be detrimental to the economic operation of the extrusion press.

Nozzle beams or modules with two longitudinal water channels feature water spray nozzles arranged in pairs, each being connected to a water channel. By appropriate arrangement of the supply of water to the channels, the water spray nozzles can be actuated individually or collectively.

The nozzle beams can be displaced step-wise or continuously, swivelled into another position or rotated about their axis. One or more nozzle beams on a common support, whether subdivided into modules or not, can be displaced or swivelled collectively, whereby the axis can lie within or outwith one of the nozzle beams. Apart from that, as already mentioned, each nozzle beam can be rotated about its own longitudinal axis.

The modules can comprise any number of nozzles between one and the maximum number of nozzles on the nozzle beam, preferably however three to ten nozzles spaced uniformly apart.

The type and quantity of cooling medium flowing through the nozzle beam and/or the individual modules per unit of time can be adjusted by known means, for example via volumeters. The term "adjustable" includes also the shutting off of the nozzle beam and/or individual modules.

The individual spray nozzles are water nozzles of the type functioning according to the particularly advantageous principle of air-water nozzles known from EP-A-0 343 103 in which the water/air mixture is set only after opening the nozzle. This principle, which was specially conceived for cooling sections and continously cast ingots, permits a drastic reduction in the amount of coolant required, which is favorable from the stand-point of operating costs.

With referance to the process for obtaining the optimum setting of the spray nozzles, that object is achieved by way of the invention in that a part of a section that is to be formed, and which has been heated to a temperature corresponding to the exit temperature at the extrusion press, is cooled using various spray nozzle arrangements with regard to distance from the section, distribution and direction of the nozzles under the same conditions of air supply and different conditions of water supply, the temperature change measured at a plurality of points, the most favorable geometrical arrangement established for the necessary flow rate of coolant, the same checked several times and, if the temperature distribution is non-uniform, at least one correction worked out.

The surface temperature of the section at the mentioned points is measured preferably for 1 to 2 minutes, in particular at a frequency of about 20 measurements per second.

On performing these measurements it is of fundamental importance that the results obtained are reproducible and correspond to the actual conditions at the extrusion press. For example the following measures are undertaken for an aluminum alloy section:

all thermocouple contacts are checked, the section is cleaned with a 20% solution of formic acid in order to remove all traces of chalk and other deposits so that a uniform surface quality is obtained, the section is heated in a furnace to 530° C. over an interval of 2 times 3 hours and held at that temperature for 30 minutes in order to ensure uniform temperature distribution, before cooling starts, the system is tilled with water from the water supply point to the modules in the nozzle beams in order to ensure homogenous starting conditions for cooling over the whole periphery of the section.

the furnace is withdrawn as quickly as possible in order to avoid a significant drop in temperature before the start of the cooling operation, the cooling is switched on and, during the whole of that phase, which lasts 1 to 2 minutes, the temperature of the section surface is measured and recorded at a frequency of 20 measurements per second and channel, immediately after the cooling has stopped, the throughput of coolant is recorded; this is not performed during temperature measurement in order to avoid any interference in coolant flow.

If the cooling is found to be insufficiently uniform over the whole periphery of the section, the flow rate of coolant is adjusted according to programmed, computer-calculated models, and if necessary the geometric arrangement of the nozzle beams with the modules adjusted with respect to distance, distribution and spraying angle. A distance of less than 100 mm is avoided, however, in order to take into account the practical conditions at an extrusion press.

In determining the geometrical arrangement of the nozzle beams a standard air flow rate of 30 Nl/min per nozzle at a pressure of 2.5 bar is taken at the start. This is done to avoid having too many parameters to consider.

With respect to the process for operating a spray unit, that object is achieved by way of the invention in that the extruded section with surface temperature almost at the solidus temperature, in the case of aluminum and aluminum alloys 550° to 580° C., is introduced into the spray unit and cooled at a rate exceeding the critical cooling rate specific to the material by means of a sprayed cooling medium that is program controlled and is adapted to accommodate the section shape and distribution of mass in the section.

The unit, optimized according to the process of the present invention, insures that during extrusion the sections remain free of bending and twisting when uniformly cooled on all sides with due regard to geometry and mass distribution by appropriate application of cooling medium.

If the sections emerging from the press are already bent and/or twisted, then these are, with respect to cross-section, irregularly cooled under computer control specific to each part of the cross-section. This way the sections are bent straight and/or freed of twist on cooling. The physical effect corresponds to that giving rise to bending and/or twisting of straight sections during cooling. If more or less coolant is applied per unit surface area than established in the above process for uniform cooling on all sides, then the section can as mentioned be bent straight or freed of twist under program-control. The appropriate programs are stored in the processor of the unit.

An air-water mixture is particularly suitable as cooling medium. The cooling rate always exceeds the critical value for the material, also with an additional arrangement of alternating water nozzles without neighboring air gaps. In the case of particularly thin parts of the section the corresponding nozzles can also be supplied only with air.

The rate of passage of a section through the spray unit is preferably 5 to 50 m/min, in particular 10 to 30 m/min. This rate of throughput must not only permit optimal conditions for cooling, but as the unit is in-line with the extrusion press, must also equally well satisfy the optimum technical and economic conditions for operating the press.

The water that is sprayed to form fine droplets is delivered in quantities such that the water completely covers the section surface then completely evaporates. The amount of water calculated by experimental simulation methods is dosed as a function of section geometry, rate of throughput of the section and the arrangement of the spray nozzles, whereby the given cooling rate is determined by prevention of mechanical deformation or straightening of distorted sections, achieving optimum mechanical properties, the productivity of the extrusion process as a whole.

As a spray unit for large sections can have 1000 or more spray nozzles, the nozzles employed are preferably those that function with low through-puts of air and water, for example 10 to 50 Nl/min., in particular 20 to 40 Nl/min air and 0.2 to 1 l/min. of water per nozzle.

The preferably fully computerised process of the present invention permits coolant supply to be reduced, for example for 30 to 60 sec., during an interruption in the extrusion process. Furthermore, and particularly significant, the preferred modular construction of the nozzle beams permits the modules to be switched on and off in a stepwise manner in the direction of movement of the section at the start of and during an interruption in the extrusion process in correspondance with the rate of throughput of the section. This way not only the amount of coolant can be reduced, but also stationary sections can be cooled as if they had passed along the whole length of the spray unit. Consequently, if e.g. sections have to be welded together end-to-end, then only a short piece has to be cut off, which is particularly important in the case of complicated, expensive sections.

The high degree of adaptability of the invention with respect to distance, distribution and direction of the spray nozzles and the program-controlled, individual dosage of coolant enables hitherto unobtainable results to be achieved with respect to metallurgical properties, deformation and extrusion speed, especially in the case of sections with the following characteristics moderate to large cross-section, large flat surfaces, pronounced asymmetry with respect to geometry and/or distribution of mass, difficult-to-cool surfaces.

whereby it is possible to employ a specific cooling rate for each alloy.

The optimum cooling conditions can be obtained quickly and effectively by determining the following parameters:

Geometrical position, with respect to distance and distribution, of the nozzle beams with the modules around the section Module-specific dosage of spray water Angle of the spray cone.

BRIEF DESCRIPTION OF THE DRAWINGS

The invention is described in greater detail in the following with the aid of exemplified embodiments represented in the drawing which are also object of dependent patent claims. The drawing shows schematically:

DETAILED DESCRIPTION OF PREFERRED EMBODIMENTS

Figure 1:
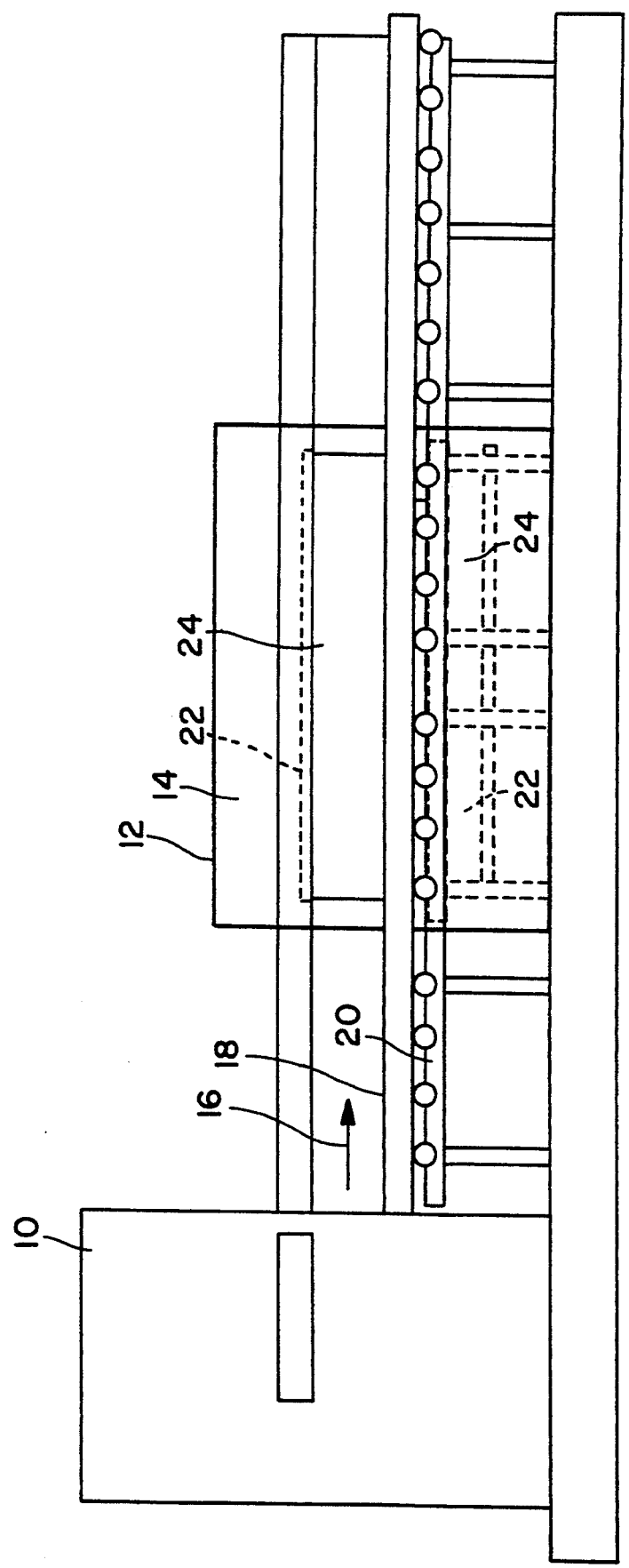
FIG. 1 a general view of an extrusion press unit.

The general overview in FIG. 1 shows, as essential parts of the facility, an extrusion press 10 and a spray unit 14 in a housing 12. An extruded section 18 of an aluminum alloy proceeding in the direction of flow indicated by arrow 16, is led at a temperature of approx. 575° C. into the spray unit 14. The section is pushed along over a set of conveyor rolls 20.

In the spray unit 14 an air-water mixture emerging from an upper and lower spray beam 22 in the form of overlapping cones forms a thin layer of water on the section surface that evaporates immediately on striking that surface.

After being quenched in the spray unit 14, the section 18 is lying on the set of transport rolls 20, i.e. it has not been bent or not noticeably so. This applies not only to the vertical direction but also to the horizontal direction.

Figure 2:
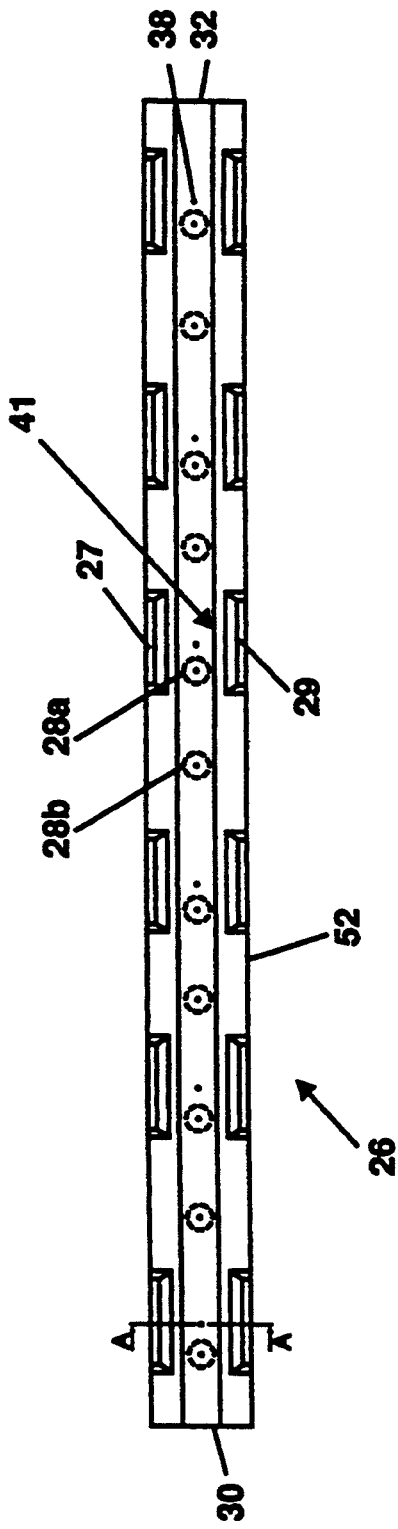
FIG. 2 a view from below of a nozzle beam module with six spraying nozzles.
Figure 3:
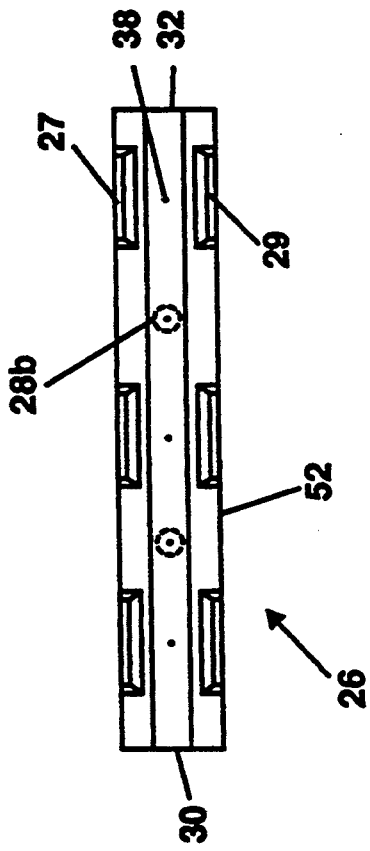
FIG. 3 another version of FIG. 2 with three nozzles.

Shown in FIGS. 2 and 3 are modules 26 with six and three spray nozzles resp. The nozzles outlets 38, which are visible from the nozzles 28, are arranged a regular distance apart e.g. 5 to 20 cm. On both sides, neighboring the nozzle outlets 38, are covers 27,29 of the air chambers. Foreseen are additional nozzles 28a, b between the nozzles 28.

The modules 26 with their ends 30, 32 next to each other, directly or spaced apart, form the lower and upper nozzle beams 22 (FIG. 1) of the spray unit. Each module 26 can be fed separately with at least one cooling medium, in the present case air and water. The flow rate of media to a module 26 can be reduced continuously down to zero. All modules at the same height, with respect to the direction of flow 16, can also be fed in communication with each other, i.e. providing an arrangement of cooling in zones.

Figure 4:
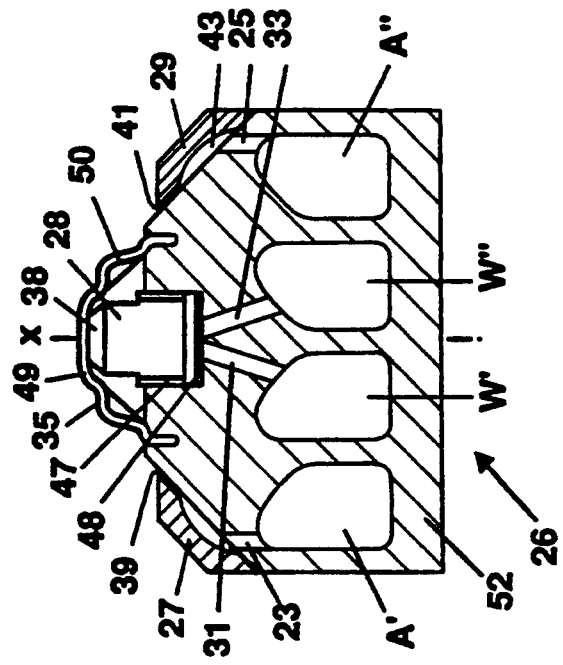
FIG. 4 a cross-section A—A as shown in FIG. 2.

As illustrated in particular in FIG. 4, the module 26 features in each of its peripheral regions a longitudinal air channel A', A'' and in the central region two longitudinal water channels W', W'''.

The air channels A', A'' are connected via channels 23, 25 with the air channels 43, 45. These air channels 43, 45 are formed by covers 27, 29 bolted onto the main body 52. An air gap 39, 41 directed towards the nozzle outlet 38 is provided between the cover 27, 29 and the surface of the main body 52 that is inclined at approx. 45°.

The water channels W', W''' are connected with the nozzles 28 via cross-intersecting channels 31,33. The nozzles are situated in a round recess 47 in the main body 52. The seal is provided by an O-ring 48 in the round channel 47.

A cover sheet 35, approximately U-shaped in cross-section and fitting into two longitudinal grooves 37 in the main body 52, spans all of the spray nozzles 28 of a module 26 and is securely screwed onto the main body 52. This way the easily exchangeable spray nozzles 28 that reside in a corresponding round recess 47 are sealed into place on the the main body 52 and connect up with the corresponding cross-intersecting channel 31, 33. Openings 49 are provided in the cover sheet 35 at the nozzle outlets 38 so that the water jet emerging from the the nozzle outlet 38 can pass unhindered through the cover sheet 35. Bulging regions 50, approximately hemispherical in shape, are present in the cover sheet 35 between the air gap 39, 41 and the nozzle axis x for the purpose of partially deflecting the air stream emerging from the air gap 39, 41. By means of these bulges 50, the air stream is partially deflected onto the spray nozzles 28b that may be situated between the nozzles 28.

The water channels W', W'''running longitudinally along the central region of the module 26 permit the use of nozzles with outlets 38 of various dimensions. The water channel W' is connected via cross-intersecting channel 31 to a first series of spraying nozzles 28 that for example allow 0.8 l of water through per minute. Water channel W''' is connected via cross-intersecting channel 33 to second spray nozzles 28a that for example allow 0.4 l of water through per minute. The first nozzles 28 are normally supplied with water, the second set of nozzles 28a only when a reduced amount of water is required. If strong cooling is called for, then the first and the second set of nozzles 28, 28a can be switched on simultaneously or along with nozzles 28b as well.

The basic set-up and manner in which the module 26 functions in the region of one of the spray nozzles 28 with neighboring air chambers 43, 45 is described in greater detail in the following with the aid of FIGS. 5 and 6 using the air-water spray arrangement known from EP-A-0 343 103.

The air-water spray arrangement 26' comprises a part 28' that forms the water-spray nozzle having for the water W a supply line 31' which narrows at an angle of 45° and forms an nozzle outlet 38', and two diametrically opposite bored channels 23', 25' for the air supply. The part 28' fits into a mating part 27', 29' while forming segmented hollow ring-shaped spaces 43', 45' connecting directly to air supply channels 39', 41'. Air supply channels 39', 41' are at an angle alpha of 45° to the nozzle axis X.

By applying different air pressures to the bore holes 23', 25' the direction of the conically jetted coolant, spray cone 24', can be altered over a wide range, angle 2 beta. By continually changing the air pressure applied to the channels 39', 41', the spray cone 24' is caused to swivel in a pendulum-like manner.

Figure 5:
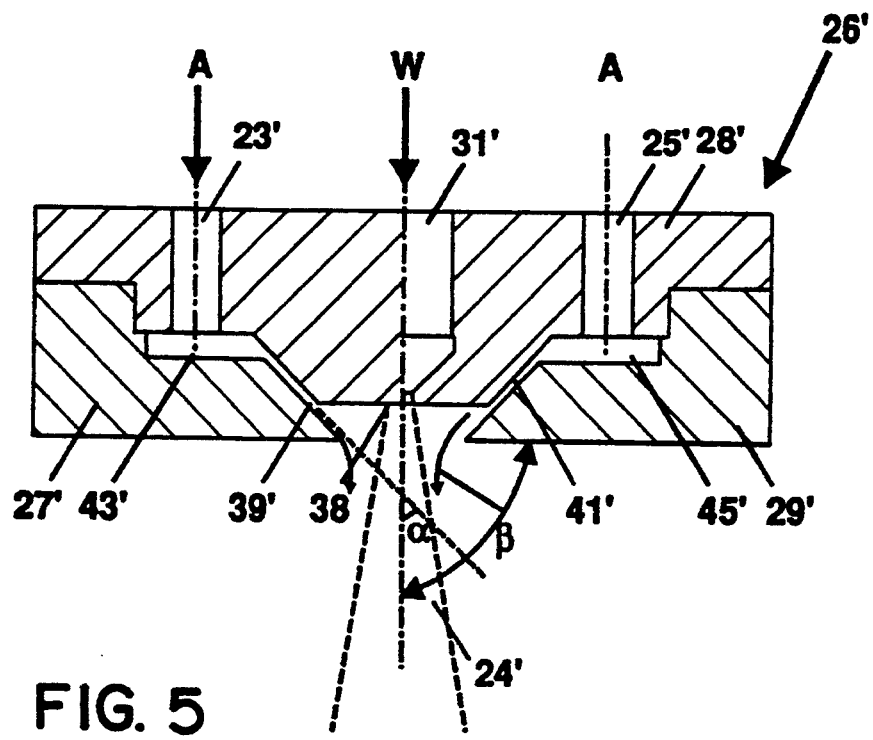
FIG. 5 a cross-section along the central axis of a state-of-the-art air-water spray device.
Figure 6:
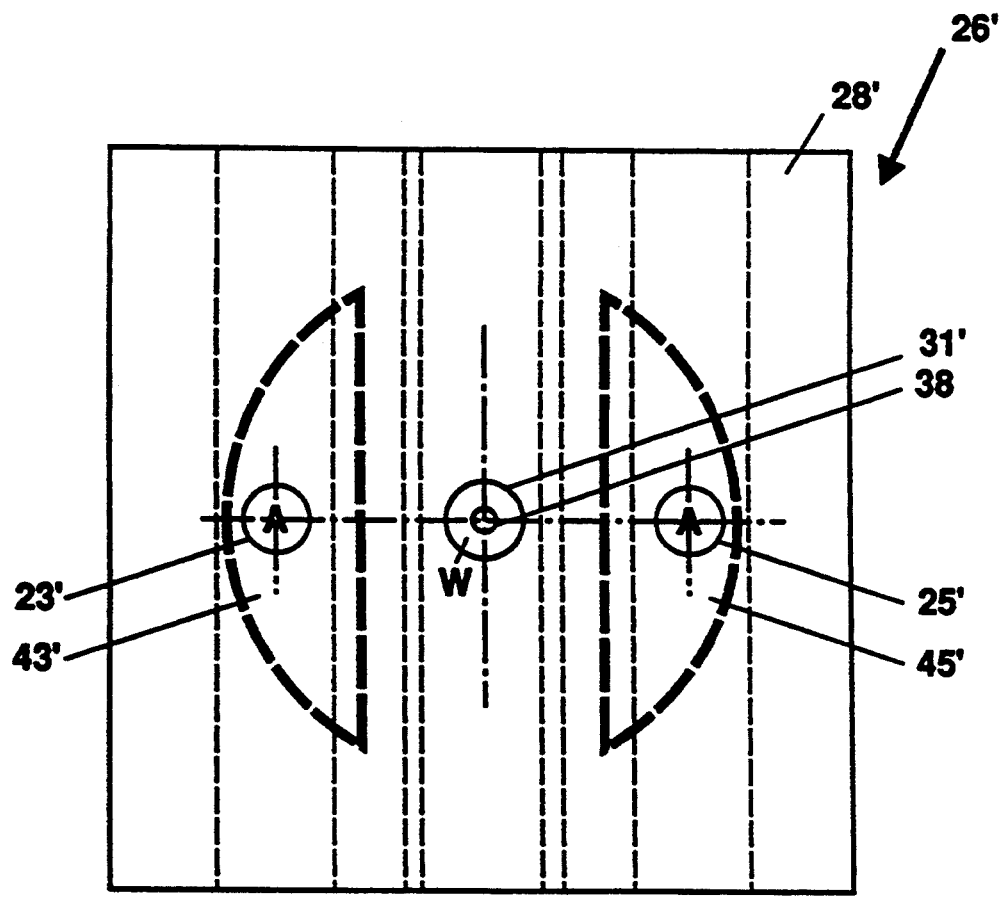
FIG. 6 a plan view of a spray device according to FIG. 5.

Using the arrangement according to FIGS. 5, 6 the air flow rate can be substantially reduced compared with a mixing process on the basis of a Venturi nozzle. Also, it has been found that by spraying the water W and accelerating the droplets by means of the compressed air A, the cooling intensity of the coolant mist is extremely uniform across the impacted surface of section to be cooled, if the spray cone 24' is swivelled in the pendulum-like manner.

The arrangement according to FIGS. 5 and 6 is explained in greater detail in EP-A-0 343 103. The spray cone 24' and its possible swivel movement are achieved in a similar way by the nozzle beam 22 or modules 26 according to the invention in that the air pressure in the air channels A', A'' can be set and varied individually.

Figure 7:
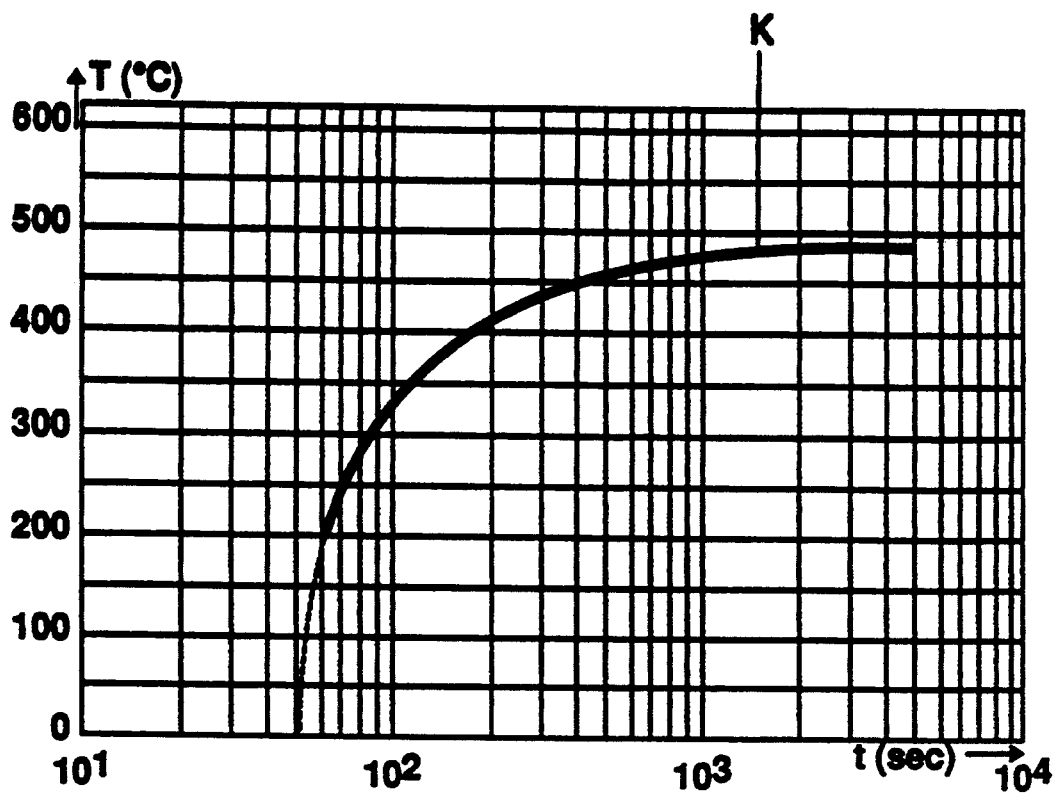
FIG. 7 the critical quenching rate of an aluminum alloy.

Shown in FIG. 7 by curve K is the critical cooling rate for an aluminum alloy (Al Si1 Mg0.8 Mn0.3) having a tensile strength of 31 nbar.

If the extruded section 18 (FIG. 1) that is to be cooled has an average temperature of 580° C. at the entrance to the spray unit 14, the temperature distribution within the section is not uniform. Local temperature differences of up to about 50° C. that can arise during extrusion in the container and at the exit of the press can appear in the section. Cooling is carded out without interruption and without any local reheating of the section. The cooling rate should always be greater than the critical value which is specific for each section; for the given aluminum alloy in FIG. 7 represented by the curve K.

Figure 8:
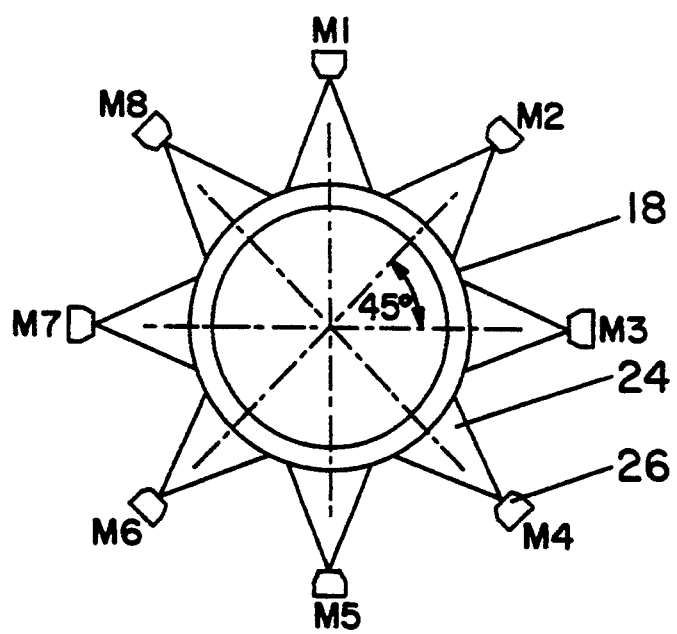
FIG. 8 the distribution of the modules for cooling a round tube.

For cooling a round section, eight modules designated M1 to M8 are employed as shown in FIG. 8. The modules 26 have spray nozzles 28 as in FIGS. 2 to 4 generating slightly overlapping spray cones 24.

In view of the uniform cross-section of the section 18 the spatial distribution of the modules 26 is also uniform. To be optimized are the distance of the modules 26 from the section 18 and the amount of cooling medium.

Figure 9:
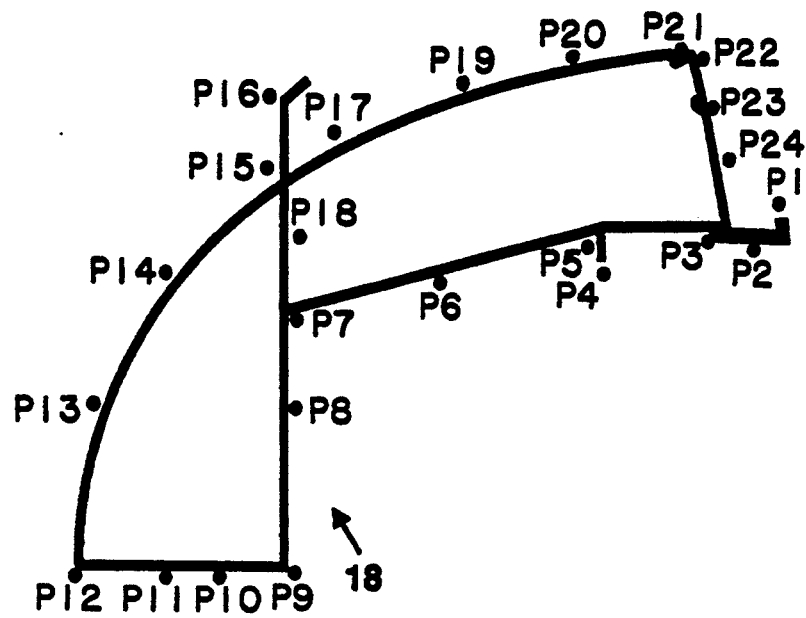
FIG. 9 the arrangement of thermocouples for determining the optimum setting for the spray nozzles around a large asymmetric extruded section.
Figure 10:
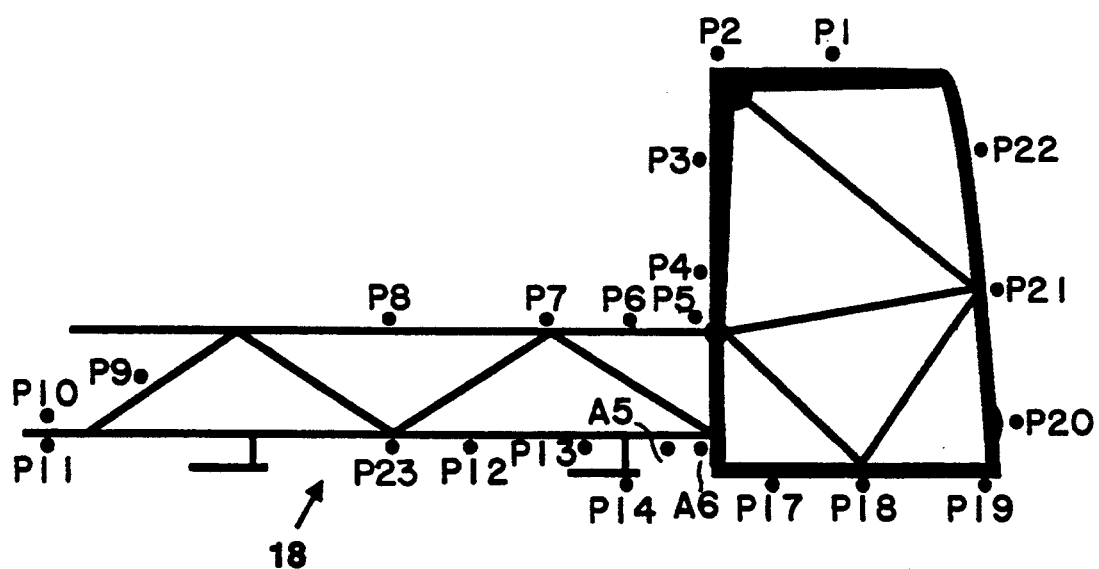
FIG. 10 another version of that shown in FIG. 9.

Shown in FIGS. 9 and 10 are large extruded sections 18 that feature a non-uniform distribution of mass and form part of a railway carriage body. Thermocouples designated $P_1$, $P_2$ ... $P_{23}$, $P_{24}$ have been placed on the surface of the section. These allow the necessary temperature measurements to be made for the purpose of determining the optimum setting of the spray nozzles. The distance of the nozzles from the section and their distribution, and the direction of the spray cones, have to be optimized until the surface cooling is reproducibly uniform. The surfaces at regions of greater mass clearly have to be supplied with greater amounts of coolant.

Figure 11:
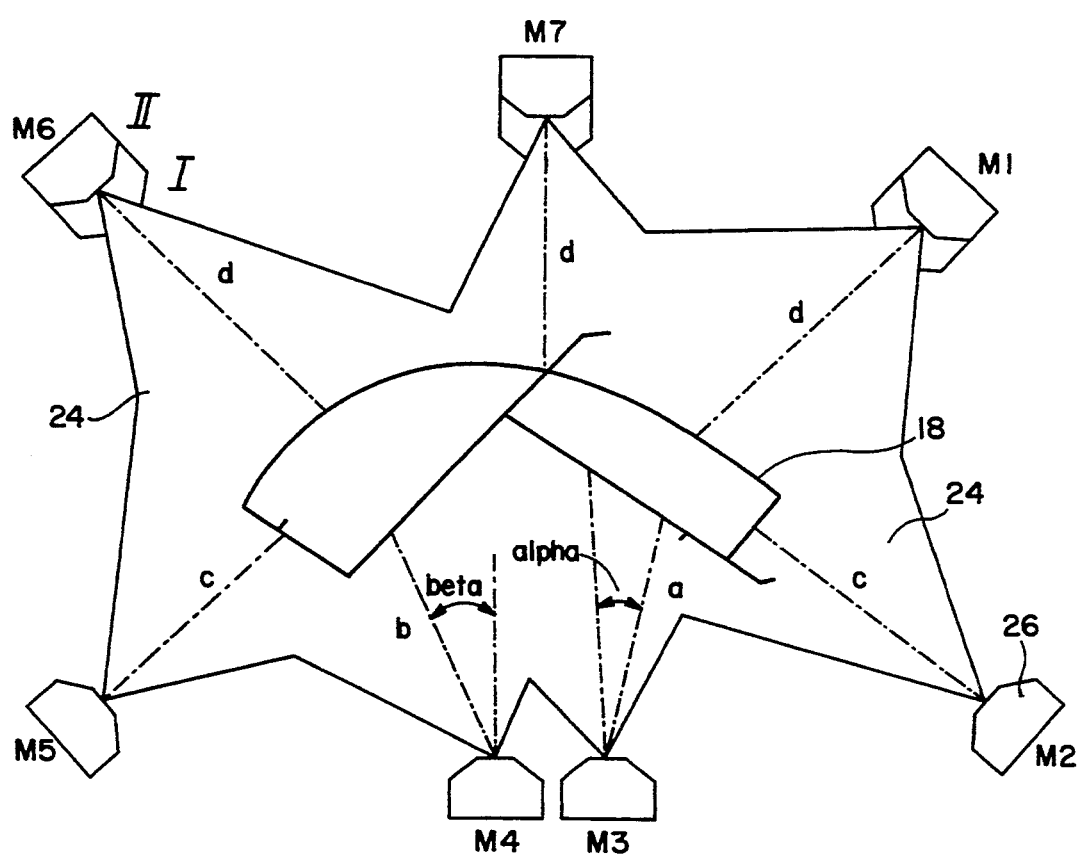
FIG. 11 optimized arrangement of modules for cooling an extruded section as shown in FIG. 9.

Shown in FIG. 11 is an arrangement of seven modules 26, M1 to M7, for cooling a section 18 according to FIG. 9. Position I shows the non-optimised arrangement, position II shows the optimized arrangement. The computed optimization showed that distances a, b, c of Nozzles M2 to M5 can remain unchanged at 170 mm, whereas the distances d of nozzles M1, M6 and M7 have been increased by 20 mm to 170 mm for the optimized position II.

Figure 12:
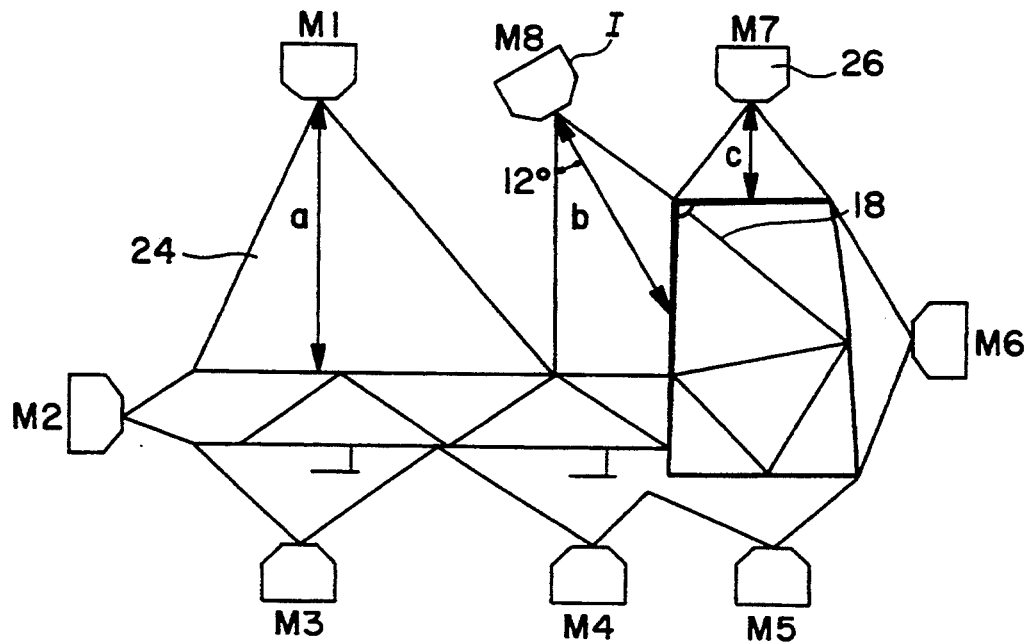
FIG. 12 a starting arrangement of modules for cooling a section as shown in FIG. 10.
Figure 13:
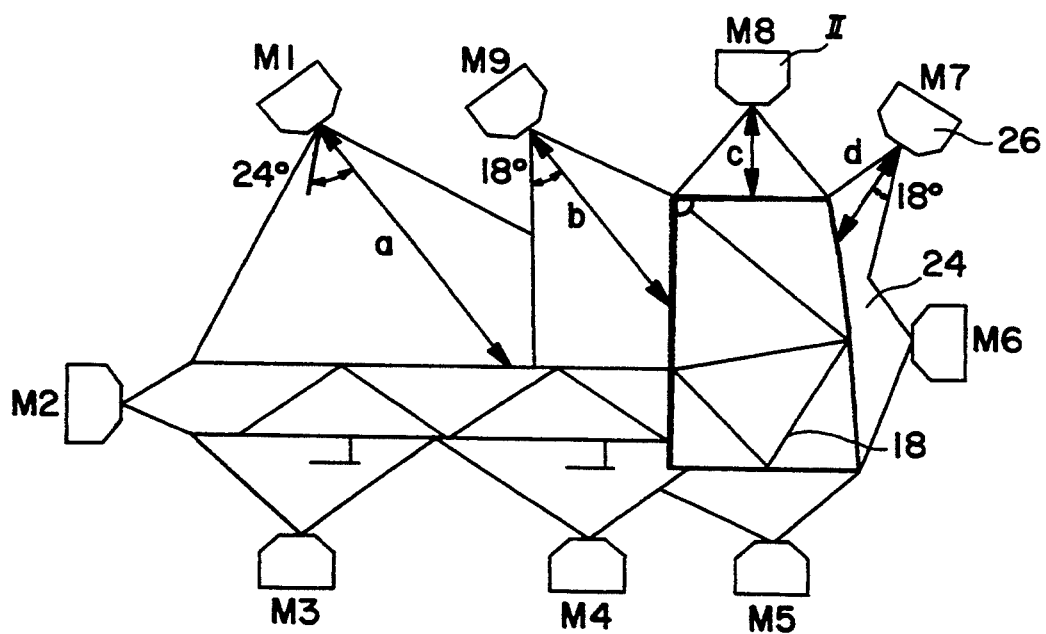
FIG. 13 the optimized arrangement of that in FIG. 12 using different cooling media.

FIG. 12 shows the non-optimized FIG. 13 the optimized arrangement with FIG. 12 of eight modules 26, designated M1 to M8, and FIG. 13 of nine modules, designated M1 to M9, for cooling a section as shown in FIG. 10. In the non-optimized configuration the amount of water sprayed is approximately in relation to the wall thickness of the section 18. The optimized configuration of the modules 26 for producing the spray cones 24 is significantly modified and the direction of the spray cones 24 altered. Finally, in the regions of the asymmetric section 18 of small wall thickness, three spray nozzles (M1, M2, M4) have been arranged, blowing only air onto the section and so producing a much milder cooling effect.

We claim:

1. Process which comprises providing a spray unit comprising spray nozzles having nozzle outlets for spraying a program-controlled cooling medium onto an extruded section, wherein the distance, the distribution of cross-section and the direction of the spray nozzles are adjustable to take into account the specific shape and distribution of mass of the extruded section, determining the optimum setting for the spray nozzles wherein a piece of section that is to be extruded, after being heated to the exit temperature of an extrusion press, is cooled with adjustment of the spray nozzles with respect to distance from the section, the distribution and direction of the nozzles under constant air flow and different, variable water flow rate conditions, wherein the temperature change is measured at a plurality of points, and wherein the geometric arrangement is determined for the required amount of coolant flow, the same checked several times and, if a non-uniform temperature distribution is found, a correction undertaken at least once.

2. Process according to claim 1 wherein the temperature of the section is measured for an interval of 1 to 2 minutes.

3. Process according to claim 2 wherein the temperature is measured at a frequency of about 20 measurements per second.

4. Process according to claim 1, including the step of arranging the spray nozzles in nozzle beams running in the direction of the extruded section, wherein the nozzle beams comprise at least one longitudinal water channel and two longitudinal air channels, wherein cross-intersecting channels branch over from the water channels to the spray nozzles and the air channels terminate in air gaps directed at the nozzle outlets.

5. Process according to claim 4, wherein the nozzle beams include modules, including the step of separately supplying cooling medium to said modules.

6. Process according to claim 4, wherein the nozzle beams include a body, and including releasably mounting the spray nozzles to the main body.

7. Process according to claim 6, including the step of holding the nozzles in place by an approximately U-shaped cover sheet.

8. Process according to claim 7, including the step of providing covers on the main body which form air chambers with the main body and an air gap directed at the nozzle outlet and connecting the air chambers to the air channels via connecting channels.

9. Process according to claim 8, including the step of providing the cover sheet with bulges between the air gaps and the nozzle outlets to deflect sideways part of the air stream emerging from the air gaps.

10. Process according to claim 5, including the step of providing that the modules feed the same number of spray nozzles and each module feeds from 3 to 10 spray nozzles.

11. Process according to claim 4, including displacing said nozzles around at least one axis running parallel to the direction of the extruded section to adapt the nozzles to said section.

12. Process according to claim 4, including setting the quantity of flow of coolant per unit of time, including the step of providing means for completely shutting off coolant supply.

13. Process according to claim 1 including the step of cooling extruded sections of aluminum or an aluminum alloy.

* * * * *